(12) United States Patent
Leone et al.

(10) Patent No.: US 6,783,686 B2
(45) Date of Patent: Aug. 31, 2004

(54) METHOD FOR REMOVING THE GASOLINE ADDITIVE MTBE FROM WATER USING MOLECULARLY IMPRINTED POLYMERS

(76) Inventors: Anna Madeleine Leone, 5537 Marshall St., Oakland, CA (US) 94608; Risto Aadolf Rinne, Jr., 2173 E. Francisco Blvd., Suite E, San Rafael, CA (US) 94901

( * ) Notice: Subject to any disclaimer, the term of this patent is extended or adjusted under 35 U.S.C. 154(b) by 367 days.

(21) Appl. No.: 09/888,968

(22) Filed: Jun. 25, 2001

(65) Prior Publication Data

US 2002/0195394 A1 Dec. 26, 2002

(51) Int. Cl.$^7$ .............................................. B01D 15/04
(52) U.S. Cl. ...................... 210/691; 210/692; 210/292; 210/908
(58) Field of Search ................................ 210/192, 908, 210/660, 666, 670, 690–692

(56) References Cited

U.S. PATENT DOCUMENTS

| | | | |
|---|---|---|---|
| 5,641,539 A | * | 6/1997 | Afeyan et al. ............... 427/222 |
| 5,814,514 A | * | 9/1998 | Steffan et al. ............... 435/262 |
| 2003/0153001 A1 | * | 8/2003 | Soane et al. .................. 435/7.1 |
| 2003/0200796 A1 | * | 10/2003 | Pawliszyn ................... 73/64.47 |

* cited by examiner

Primary Examiner—Chester T. Barry
(74) Attorney, Agent, or Firm—Risto A. Rinne, Jr.

(57) ABSTRACT

A method and product for removing at MTBE molecules from a solution, such as a contaminated aquifer, includes exposing the solution to a plurality of molecularly imprinted polymer beads (MIPS) that have receptor sites on the surfaces thereof that include imprints that match the physical shape of at least a portion of an MTBE molecule. A quantity of the MTBE molecules align with and adhere to some of the receptor sites and, accordingly, they are removed from the solution producing a remediated solution. According to one embodiment, the MIPS are contained in an enclosure having a plurality of openings large enough to permit the solution to pass through and small enough so as to prevent the MIPS from passing through. According to a preferred embodiment the MIPS are applied (i.e., coated) to the inside surface of a conduit and the solution is forced or allowed to flow through the conduit thereby removing some of the MTBE molecules therefrom.

28 Claims, 4 Drawing Sheets

EITHER
1) MIPs FOR MTBE
   OR
2) GAC adsorbent
MIXED INTO WATER CONTAINING
500 ppB OF MTBE
STIRRED FOR 1 HOUR AND THEN
ANALYZED FOR AMOUNT OF MTBE
REMAINING IN WATER.

EITHER
1) MIPs FOR MTBE
   OR
2) GAC adsorbent
MIXED INTO WATER CONTAINING 500 ppB OF MTBE
STIRRED FOR 1 HOUR AND THEN ANALYZED FOR AMOUNT OF MTBE REMAINING IN WATER.

METHOD FOR REMOVING THE GASOLINE ADDITIVE MTBE FROM WATER USING MOLECULARLY IMPRINTED POLYMERS

BACKGROUND OF THE INVENTION

1. Field of the Invention

The present invention, in general, relates to removing MTBE from water or from an organic solvent and, more particularly, to a method for removing a portion of the MTBE from the water or from the organic solvent by exposure thereof to a molecularly imprinted polymer.

MTBE (Methyl tertiary-butyl ether) is a chemical compound blended into gasoline supplies with the intent of increasing the octane and reducing air emissions. It is a volatile, flammable, colorless liquid at room temperature, and it has an odor that resembles that of turpentine.

It mixes with gasoline and it is soluble in water. The production of MTBE and its domestic use decreases the need for foreign oil.

Health complaints related to MTBE were first reported in Fairbanks, Ak. in November, 1992. Since then health concerns related to the presence of MTBE in the environment has led to its use being either reduced or banned in certain areas. The cost of remediating the environmental effects of MTBE are estimated in the billions of dollars.

In Santa Monica, Calif. the city shut down several drinking water wells with MTBE concentrations of 600 ppb (parts per billion). The EPA limit is 16 ppb.

MTBE contamination of aquifers is due primarily to leaking underground storage tanks. The gasoline and MTBE eventually find their way into the aquifers. Clearly, a method of removing at least some of the MTBE from water prior to its consumption is desirable.

The petroleum producers are also seeking technologies that will prevent gasoline spills or leaking underground storage tanks from spreading MTBE into ground waters.

MTBE is difficult to remove from water or from other types of organic solvents. Water remediation processes take many forms but one typical procedure requires holding tanks, pumps, and adsorption materials. Generally, tons of absorbent are used at any one site.

Examples of such adsorbents include GAC (granulated activated charcoal) and a similar product known as "organoclay". The primary producers of GAC are Calgon Carbon Corporation in Pittsburgh, Pa. and Norit NV in the Netherlands. Calgon Carbon Corporation estimates that United States customers recently purchased about 20,000 tons of a GAC annually that is specifically designed to adsorb small molecules, such as MTBE. This adsorbent product sells for about $3500.00 per ton presently.

Furthermore, these prior adsorbent technologies require that millions of tons of wood be burnt to produce the necessary charcoal, which by itself incurs a substantial negative environmental effect (i.e., consumption of resources, additional green-house gas emissions).

Furthermore, these prior products are, for the most part, non-recyclable.

In addition, these prior products are non-specific in the components that they adsorb. This, at best decreases their efficacy, and at worst has them removing components that are not intended to be removed from the water.

Obviously, the need for clean water is crucial. All of the community water systems (approx. 54,000) in the United States are protected by Federal, State, and Local regulations. These regulations specify the maximum contamination levels (MCL) for hazardous substances. They also provide the requirement and enforcement procedures for ground water remediation and mechanisms for limiting the concentration of substances entering water systems (i.e., aquifers).

The deleterious effects MTBE are only partially understood at present but they are substantial and clearly, a need to remove MTBE from water or from an organic solvent is desirable.

2. Description of Prior Art

Water remediation processes are, in general, known and they take many forms, one typical procedure requiring the use of holding tanks, pumps, and adsorption materials (i.e., GAC) to which the water is exposed.

While the structural arrangements of the above described methods, at first appearance, may have similarities with the present invention, they differ in material respects. These differences, which will be described in more detail hereinafter, are essential for the effective use of the invention and which admit of the advantages that are not available with the prior methods.

OBJECTS AND SUMMARY OF THE INVENTION

It is an object of the present invention to provide a method for removing an MTBE molecule from water by exposing the water to a molecularly imprinted polymer having an imprint on a surface thereof that corresponds to at least a portion of the shape of an MTBE molecule.

It is also an important object of the invention to provide a method for removing MTBE from water using molecularly imprinted polymers that is economical to use.

Still another object of the invention is to provide a method for removing MTBE from water using molecularly imprinted polymers that is highly selective in removing the MTBE molecule while leaving unaffected other molecules.

Still yet another object of the invention is to provide a method for removing MTBE from water using molecularly imprinted polymers that does not expose the water to substantial amounts of organic solvents or other undesirable or toxic chemicals.

Yet another important object of the invention is to provide a method for removing MTBE from water using molecularly imprinted polymers that is safe to use.

Still yet another further important object of the invention is to provide a method for removing MTBE from water using molecularly imprinted polymers that is effective for commercial water remediation use.

Still one further object of the invention is to provide a reusable method for removing MTBE from water using molecularly imprinted polymers.

Briefly, a process in accordance with the principles of the present invention includes the formation of molecularly imprinted polymers (MIPS) that contain an imprint of the MTBE molecule. The formation of the MTBE imprinted molecular polymers are formed by exposing a polymer, in liquid form, to a concentration of MTBE molecules, and then hardening the polymer by heating or irradiating it. The polymer is then ground to form beads which have a plurality of exposed binding sites for MTBE. The beads are then washed using a preferred solution or solvent to remove the MTBE molecules from the surface of the beads to provide cavities which function as exposed binding sites that correspond to a molecular imprint (i.e., the shape) of at least a portion of the MTBE molecule. A solution (i.e., water) that is contaminated with MTBE is exposed to the washed beads. The MTBE molecules find receptor sites to which they then adhere. The aqueous solution is allowed to mix with the beads resulting in a purified water solution. Adherence of the MTBE molecule to each of the binding sites occurs through a variety of well-known methods, such as electrostatic bonding, hydrogen bonding, and other forms of non-covalent bonding as well as other bonding approaches including sacrificial spacer, covalent bonding, and copper binding site approaches. The use of other known and emergent approaches to forming the molecularly imprinted polymers to increase efficacy in solution are also anticipated.

DETAILED DESCRIPTION OF THE INVENTION

Figure 1:
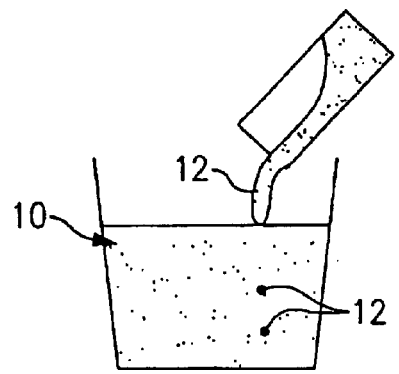
FIG. 1 is a side view of a plastic (polymer) solution at elevated temperature with MTBE molecules being added thereto.

Referring on occasion to all of the FIGURE drawings and in particular to FIG. 1 is shown a polymer monomer in solution, hereinafter referred to as "the polymerization mixture" and identified in general by the reference numeral 10. The polymerization mixture 10 is also sometimes referred to as a "reaction mixture".

The polymerization mixture 10 includes MTBE molecules, identified in general by the reference numeral 12, being added thereto and in solution throughout the polymerization mixture 10. The MTBE molecules 12 are mixed or blended into the polymerization mixture 10 by stirring the polymerization mixture 10, as desired.

The polymerization mixture 10 contains methacrylic acid (functional monomer), ethyleneglycol dimethacrylate (cross linker), 2,2'-azo-bis-isobutyronitrile (polymerization initiator) and toluene (porogenic solvent). This is one possible formulation for making the polymerization mixture 10.

The MTBE molecules 12 that are added to the polymerization mixture 10 may contain some impurities, but the intent is to introduce a quantity of only the MTBE molecules 12 at this time. Such an addition is sometime referred to as being "exogenous".

Alternatively, other agents or chemicals may be added to the polymerization mixture 10 to aid, as desired, in the homogenization (i.e., the even dispersion) of the MTBE molecules 12 throughout the polymerization mixture 10.

The MTBE molecules 12 are, of course, too small to see individually in the FIG. 1 drawing and are shown only to indicate a concentration thereof as being formed and dispersed throughout the polymerization mixture 10.

It is noted that each of the MTBE molecules 12 are all identical types of structures. At this time, a concentration of the MTBE molecules 12 is introduced to the polymerization mixture 10.

The term "the MTBE molecule(s) 12", as used herein, is intended to apply to any MTBE molecule or grouping thereof.

Figure 2:
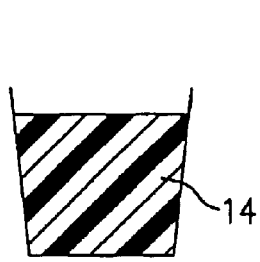
FIG. 2 is a side view of the solidified polymer containing the MTBE molecules embedded in the polymer.

Referring now to FIG. 2, is shown a hardened polymer mass, identified in general by the reference numeral 14. The polymer mass 14 contains the concentration of the MTBE molecules 12 dispersed throughout. (The individual MTBE molecules 12 are not shown in the FIG. 2 drawing or in certain of the other FIG. drawings but they are present (at least to some small extent) in each of the FIG. drawings.

The MTBE molecules 12 have a unique shape, and so they form cavities or pockets throughout the polymer mass 14 that surrounds and contains them. As such, the polymer mass 14 is a formation of a molecularly imprinted polymer (MIP), that is imprinted to the MTBE molecules 12 that they contain. A very large number of the MTBE molecules 12 are contained in the polymer mass 14 (MIP).

There are at least three known ways to change the polymerization mixture 10 into a solid so as to form the polymer mass 14. The first is by irradiating the polymerization mixture 10 that is used with ultra-violet light so that it changes state from a liquid into a solid. This is a preferred method and is used with the formulation for the polymerization mixture 10 given hereinabove.

Alternative ways to form the polymer mass 14 are by heating and/or the addition of a chemical polymerization initiator that is mixed with the polymerization mixture 10, thereby changing it from a liquid state into a solid state.

While in solution (liquid state), the polymerization mixture 10 is said to contain monomers and when it is hardened into a solid it is referred to as a polymer or as referenced herein, the polymer mass 14.

The initiator, whichever is used, causes the monomers to link together and to form a solid. The monomers seek the tightest configuration possible as they solidify around the MTBE molecules 12. As a result, the polymer mass 14 contains an innumerable quantity of the MTBE molecules 12 that are each tightly surrounded by the polymer mass 14.

Processes to form the polymer mass 14 are well known in the plastic arts. However, an analogy to illustrate how the MTBE molecules 12 are enclosed by the polymer mass 14, which is new, may be useful. The analogy has an irregularly shaped rock (not shown) suspended in water (not shown) while the water is cooled so as to form ice (not shown). The rock represents one of the MTBE molecules 12 and the water represents the polymerization mixture 10 (i.e., the monomers) and the ice represents the polymer mass 14.

As the water freezes, the ice forms an enclosure, or a cavity or a pocket, that surrounds the irregularly shaped rock. If the ice were cut in two around a maximum circumference of the rock and the rock was then removed from the cavity, the ice would reveal two pockets, each pocket being a very close match to the shape of the rock. The surface pattern and irregularity of the surface of the rock would correspond with that of each pocket.

No other rock would fit into the pocket as perfectly as would the rock that the ice surrounded. In fact, if the rock were correctly aligned and placed into either pocket, it would fit in there so well that it would naturally stay in place unless it was acted upon by some force to remove it.

Figure 3:
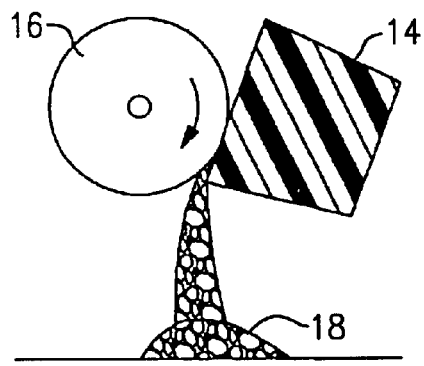
FIG. 3 is a side view of the solidified polymer being ground to form polymer beads.

Referring now to FIG. 3 is shown a grinding wheel 16 to which the polymer mass 14 is being applied and ground into a plurality of unwashed polymer beads, identified in general by the reference numeral 18. Each of the unwashed beads 18 contains innumerable MTBE molecules 12, many of which are at the surface of the unwashed beads 18. Some of the MTBE molecules 12 that were used to form the imprint are surrounded by and therefore contained within the unwashed beads 18. They remain therein and are of no consequence.

It is only the MTBE molecules 12 that happen to be disposed on the surface of each of the unwashed beads 18 that are of consequence because they provide the locations for the MTBE molecules 12 to later adhere to that are part of the solution that is to have a portion of the MTBE removed therefrom, as is described in greater detail hereinafter. But first, many of the MTBE molecules 12 that are disposed on the surface of the unwashed beads 18 that were initially used to imprint the MIPS must be removed to make room for the MTBE molecules 12 that are disposed in the contaminated water to bind, as is described in greater detail hereinafter.

The unwashed beads 18 form a plurality of molecularly imprinted polymers (MIPS) because they each contain (ideally) a great many imprints of the MTBE molecules 12. Some of these imprints are on the surface and some, as mentioned hereinabove, are contained within the unwashed beads 18. The polymer mass 14 (MIP), after grinding, includes a plurality of smaller pieces that form the unwashed beads 18 (MIPS).

There are many ways for forming the unwashed beads 18 from the polymer mass 14 and include, for example, grinding, pulverizing, or fracturing the polymer mass 14 so as to produce the unwashed beads 18. The illustration of the grinding wheel 16 is intended to reveal a way, but by no means to limit their formation.

Depending upon the application, the polymer mass 14 may be ground to produce the unwashed beads 18 having any desired range of sizes (diameters). Obviously, the finer the unwashed beads 18 are, the greater will be the resultant surface area. The process of removing some of the MTBE molecules 12 from the water is described in greater detail hereinafter, however for now it is sufficient to note that a greater surface area translates into more opportunities to capture the MTBE molecules 12 simply because there are more receptor sites available, as is also discussed in greater detail hereinafter.

Therefore, a smaller (finer) granulation of the unwashed beads 18 will, generally, improve the efficacy of the removal process.

However, there are situations where a larger diameter or coarser size for the unwashed beads 18 is desirable, such as to improve the containment of them (or of the washed beads 22, as is described in greater detail hereinafter). After the unwashed beads 18 have been cleaned, they are herein referred to as "washed beads" and are identified by the reference numeral 22.

Commercial applications that reuse the washed beads 22 may benefit from a coarser type of the unwashed and the washed beads 18, 22. A coarser variety likely will be more durable for repeated use (repeated use is described in greater detail hereinafter) or, as mentioned hereinabove, they may be more easily contained. Containment of the washed beads 22 during use is described in greater detail hereinafter.

If coarser types of the washed beads 22 are used and it is desirable to increase the efficacy of the MTBE removal process, then either more of the coarser variety of the washed beads 22 may be used or the length of time of exposure of a solution 30, such as a source of contaminated water (to the washed beads 22 may be increased, or both, as are described in greater detail hereinafter.

Not to serve as a limitation, but rather to indicate a possible size for the unwashed or the washed beads 18, 22, a diameter thereof of approximately 25 um (micrometers) is anticipated. Larger and smaller diameters of the unwashed beads 18 and the washed beads 22 are certainly anticipated and are determined by the application at hand and by the economics to produce the unwashed and washed beads 18 22, as well.

Figure 4:
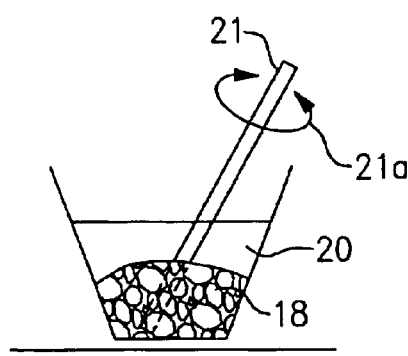
FIG. 4 is a side view of the polymer beads being washed to remove the MTBE molecules from the surface thereof.

Referring now to FIG. 4, the unwashed beads 18 are in a cleaning solution 20, in which they are stirred and agitated, sufficient to remove the MTBE molecules 12 therefrom that are bound to the receptors on the surface of the beads 18. This step is the washing (or cleaning) of the beads 18 to remove the MTBE molecules 12 on the surface thereof that were initially added to and mixed with the polymerization mixture 10.

Any of the terms (singular or plural) "receptors", "sites", "surface sites", "receptor sites", "binding sites", "cavities", "imprints", "surface imprints", or "MTBE receptors" as used, are interchangeable and refer to any of a plurality of locations on the surface of the unwashed beads 18 and the washed beads 22 to which the MTBE molecules 12 may adhere (bind).

The cleaning process is repeated as often as necessary and by using whatever is the preferred method or material to form the cleaning solution 20 until the surface of the unwashed beads 18 have been adequately cleaned (i.e., a sufficient amount of the MTBE molecules 12 have been removed).

For example, simply washing with hot soapy water is possible and may provide acceptable results (i.e., a sufficient amount of MTBE molecules 12 being removed) for certain applications or the use of an acidic solution, tantamount to a lemon-water solution, may be used to form the cleaning solution 20, followed in each case by rinsing with pure water. Similarly, the use of an acidic alcoholic mixture may be used to form the cleaning solution 20.

The use of solvents, in particular organic solvents, is also possible. It is noted that no undesirable effects arise from use of organic solvents in the initial MTBE removal process because the solvents are removed from the beads 18 prior to exposing the solution 30 to them.

According to the presently disclosed processes, only the unwashed beads 18 are exposed to the cleaning solution 20 which can, if desired, contain various types and concentrations of the organic solvents (and/or other types of solvents) to remove the MTBE molecules 12 from the surface of the beads 18.

The unwashed beads 18 are then further exposed to other formulations of the cleaning solution 20 to further wash and clean them and therefore to remove a sufficient amount of the organic solvent (or other type of a solvent) residue which may be present on the unwashed beads 18 to a sufficiently low level. In this way, and as is described in greater detail hereinafter, the solution 30 is not exposed to a strong concentration of the organic solvents during the MTBE removal process.

As is described in greater detail hereinafter, after the unwashed beads have been washed they are referred to as "washed beads 22". Accordingly, it is more accurate then to state that any residue which the solution 30 may be exposed to are on the washed beads 22, rather than on the unwashed beads 18.

The residue, if any, being of a very low concentration level, is of no significant consequence.

Referring again in particular to FIG. 4, a rod 21 is shown in contact with the unwashed beads 18 in the cleaning solution 20. The rod 21 is being stirred, as indicated by arrow 21a. The use of the rod 21 (or other mechanical means) to stir the beads 18 is well known in the cleaning arts, generally, and produces a more effective cleaning (washing) action as a result of a mechanical motion being imparted to the unwashed beads 18 while they are exposed to the cleaning solution 20.

The rod 21 and stirring action 21a can be omitted, if desired. Of course, the use of other types of devices (not shown) to further agitate the unwashed beads 18 are anticipated so as to more effectively wash them. For example, a simple shaking of the unwashed beads 18 and the cleaning solution 20 can be used. This shaking can be at any desired frequency including any of the higher frequencies that are associated with cleaning items in solution. These higher frequencies are sometimes referred to as "ultrasound", being of a frequency that resides above the auditory range of most people.

What is important is to utilize all available technologies to economically, quickly, and safely clean the unwashed beads 18. Cleaning the beads 18 means removing a sufficient amount of the MTBE molecules 12 therefrom. It also includes the removal of a sufficient amount of any residue of the cleaning solution 20 itself, such as by repeatedly rinsing the unwashed beads 18 with pure water.

To continue the rock and ice analogy from hereinabove, the step of grinding the polymer mass 14 and the step of washing (i.e., cleaning) the unwashed beads 18 would be the fracturing of the ice so as to permit the removal of the rock from the surface of the ice.

Figure 5:
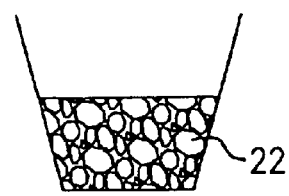
FIG. 5 is a side view of the washed and dried polymer beads.

Referring now to FIG. 5, after sufficient exposure to the cleaning solution 20 has occurred, the result yields a quantity of the washed beads 22, as shown. The washed beads 22 are the unwashed beads 18 that have been cleaned so as to have had a sufficient proportion of the MTBE molecules 12 removed from the surfaces thereof. Certain of the MTBE molecules 12 (from the original added concentration of the MTBE molecules 12) will remain, as mentioned hereinabove, inside of the various washed beads 22, however they are not of concern in that they are each surrounded by parts of the polymer mass 14, and are, therefore, contained.

The washed beads 22 are dried, if desired, by any manner that is preferred. The washed beads 22 include many cavities which function as specific binding (i.e., receptor) sites for the MTBE molecules 12 (in the solution 30) at the surface thereof and which correspond with at least a portion of the molecular shape of the MTBE molecule 12.

These cavities, which as mentioned hereinabove are also referred to surface sites, receptor or receptive sites, binding sites, etc., are the shapes that remain after the MTBE molecules 12 (from the concentrated mixture) have been removed from the surfaces of the washed beads 22. They are the spaces that remain on the surface of the washed beads 22 from where the MTBE molecules 12 have been removed and their function is discussed in greater detail hereinafter.

Figure 6:
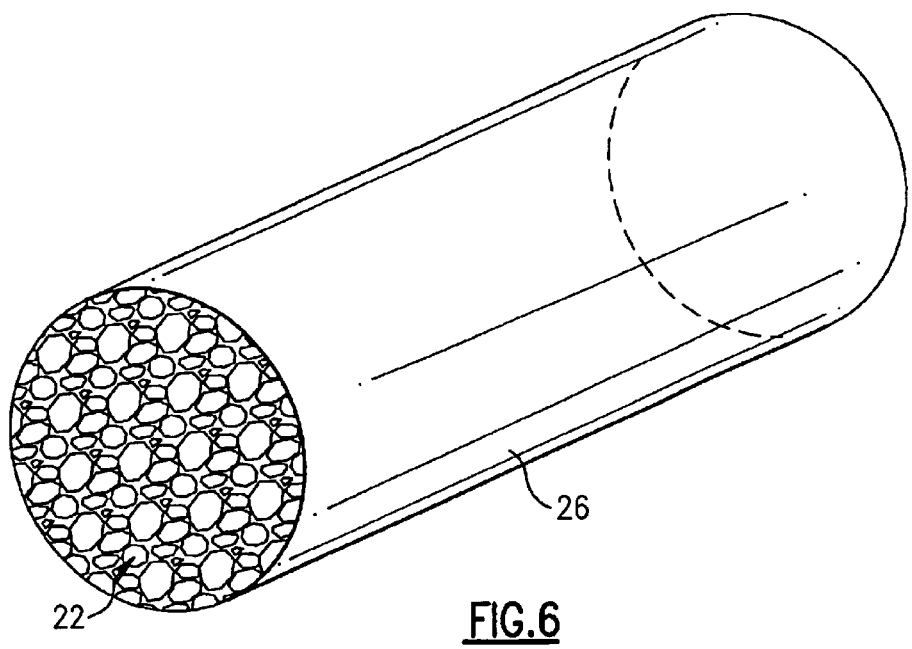
FIG. 6 is a view in perspective of the washed and dried polymer beads coated along the inside surface of a conduit.

Referring now to FIG. 6, a predetermined quantity (the magnitude of which depends upon the intended application) of the washed beads 22 are adhered to the inside surface of a conduit 26. The washed beads 22 are coated to the inside of the conduit 26 to which they adhere by the use of an adhesive or any other preferred method of attachment.

Figure 7:
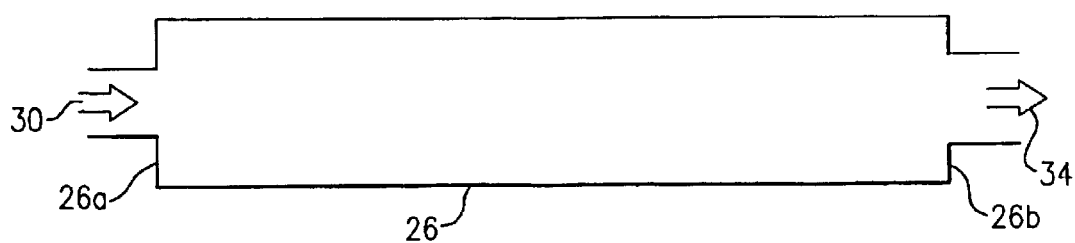
FIG. 7 is a cross-sectional side view of the conduit of FIG. 6 with an aqueous solution (i.e., water that is contaminated with MTBE) flowing through the conduit.

Referring now to FIG. 7, the conduit 26 has a first end 26a through which the solution 30 (i.e., contaminated water from an aquifer) is pumped into the conduit 26. The solution 30 enters in from the first end 26a although the process would be as effective if the direction of flow were reversed. The solution 30 contains an abundance of the MTBE molecules 12 as a contaminant that enters into the first end 26a of the conduit 26, passes through the conduit 26, and exits from an opposite second end 26b thereof after having had some of the MTBE molecules 12 removed therefrom. As is described in greater detail hereinafter, a remediated solution 34 is what exits from the second end 26b of the conduit 26. The solution 30 becomes the remediated solution 34 after having had some of the MTBE molecules 12 removed therefrom.

Other methods of containing the washed beads 22, such as in a container are anticipated, and of flowing the solution 30 through the container and of contacting the washed beads 22 sufficient to remove some of the MTBE molecules 12.

However, it is worth noting that even if a modified type of an solution [not shown] that included MTBE, for example gasoline itself, was subjected to the processes herein disclosed, the effect would again be to remove a portion of the MTBE molecules therefrom.

The solution 30 flows through the conduit 26 where it commingles with the washed beads 22 that are disposed therein.

A portion of the MTBE molecules 12 that are dispersed in the solution 30 are deposited in and adhere to the receptor (surface) sites of the washed beads 22, thereby capturing some of the MTBE molecules 12 and effectively removing them from the solution 30.

To continue the ice and rock analogy, it is as if water (which represents the solution 30) containing the rock was poured over the ice. To further the analogy, the water would contain many identically shaped rocks (and possibly other differently shaped rocks) and the ice would contain many identically shaped cavities that correspond to the shape of at least a portion of each of the identically shaped rocks.

Eventually, portions of some of the identically shaped rocks properly align with correspondingly shaped portions on some of the cavities, into which they are deposited and, accordingly, deposited. As they are deposited, they become captured and are effectively removed from the flow of the water. The differently shaped rocks do not find matching cavities, are not deposited, and therefore are not removed from the water. So it is also with the MTBE molecules 12 in the solution 30 in that they too are deposited into the receptor sites and are removed from the solution 30. The differently shaped rocks, from the analogy, would correspond with the various other molecules in the solution 30 that are not targeted by the receptor sites (i.e. the cavities), are not deposited, and therefore not removed from the solution 30.

Accordingly, a method to specifically target the MTBE molecules 12 alone for removal from the solution 30 is provided.

Continuing the analogy, the remaining water will have had a certain number of the "identically shaped rocks"

removed by this process. With regard to the target rock, namely those which are identically shaped, the final supply of water will have been "de-rocked", for lack of a better word.

Similarly, referring again to FIG. 7, the solution 30 will have had a certain number of the MTBE molecules 12 removed therefrom. The process of removing a portion of the MTBE molecules 12 from a substance can generally be referred to in the art as "remediation", and the resultant product is said to be "remediated" and is herein referred to as a "remediated solution 34" that has exited from the second end of the conduit 26.

By varying the length of the conduit 26, the rate of flow of the solution 30 therein, and other factors such as the size of the beads or the temperature of the solution 30, the efficacy of the process can be varied.

By increasing the time the solution 30 is exposed to the washed beads 22, the likelihood that more of the MTBE molecules 12 therein will find adherence with the receptor sites (cavities) on the washed beads 22 is also increased.

Of course, another way to regulate the efficacy of the process is by increasing or decreasing the number of washed beads 22 that the solution 30 is exposed to. More washed beads 22 for the solution 30 to pass by provides more sites to capture the MTBE molecules 12 and therefore more opportunities to remove the MTBE molecules 12 from the aqueous solution 30. Conversely, less washed beads 22 will provide less binding sites and less removals. Accordingly, another method to regulate the efficacy of the remediation process is provided by varying the quantity of the washed beads 22 to which the solution 30 is exposed.

Also, by varying the density of the MTBE molecules 12 in the polymer mass 14, it is possible to influence the resultant number of receptor sites on the washed beads 22. More MTBE molecules 12 results in an increased density of receptor sites on the unwashed and washed beads 18, 22 and a corresponding increase in efficacy of the remediation process. Correspondingly, less MTBE molecules 12 being present when the polymer mass 14 is being formed will result in fewer binding sites and fewer of the MTBE molecules 12 being removed from the solution 30. Accordingly, another method to regulate the relative number of the MTBE molecules 12 that remain in the remediated solution 34 is provided.

Still another way to regulate the efficacy is to control the quantity of the solution 30 that will be exposed to the washed beads 22. If a small quantity of aqueous solution 30 is exposed to the washed beads 22, then ample receptor sites will be available in the washed beads 22 for capture of the MTBE molecules 12. If a larger quantity of the solution 30 is exposed to the washed beads 22, then certain of the receptor sites will contain the MTBE molecules 12 that have been deposited therein from an earlier extraction from the solution 30 thereby preventing the capturing of additional quantities of the MTBE molecules 12 in those "already filled sites", thereby reducing the efficacy of the process. By varying the rate of flow of the solution 30 through the conduit 26 the quantity of solution 30 that is exposed is controlled.

Other methods to regulate the efficacy of the remediation process are also anticipated. For example, varying the temperature of the solution 30 may be useful in influencing the ease by which the MTBE molecules either find or remain adhered to the receptor sites on the washed beads 22.

Regulating the number of the washed beads 22 may be combined with regulating the time of exposure of the solution 30 to the washed beads 22, as desired, to further determine the efficacy of the process, as may the quantity of solution 30 also be regulated in combination with any other influencing factor.

The remediation process is accomplished to the degree of efficacy as the limits of the process determine in conjunction with the objectives for remediation. For example, if the it is desired to have 20–30% of the MTBE molecules 12 removed from the solution 30, the process is regulated to ensure that the remediated solution 34 falls within that range. If it is desirable to have a greater percentage of the MTBE molecules 12 removed, the efficacy of the process is regulated by any preferred means to attain the desired degree of remediation.

There is no limit inherent with this process that would prevent achieving any desired remediation efficacy approaching the limit of 100% removal of the MTBE molecules 12 from the solution 30. Of course, no process is perfect and therefore it is unrealistic to imagine that all of the MTBE molecules 12 can be removed. Accordingly, 100% is not a practical efficacy to attain with this or any other known process for MTBE remediation.

After a predetermined quantity of the washed beads 22 have been exposed to a predetermined quantity of the solution 30, it can be assumed that the efficacy of the process will diminish, as many of the sites for binding become filled with the MTBE molecules 12 thereby rendering progressively fewer open (available) receptor sites.

Either a new stock (supply) of washed beads (not shown) in a new conduit (not shown) would then be utilized or the previously used quantity of the washed beads 22 that have subsequently become saturated (to some extent) in the conduit 26 with the MTBE molecules 12 would again be cleaned and then reused.

There are many ways of cleaning the conduit 26 and one of them includes exposing the washed beads 22 in the conduit 26 with a mildly acidic solution (vinegar, lemon juice, etc.) that is flowed therein and then rinsing with water would likely remove a sufficient quantity of the MTBE molecules 12 therefrom so as to allow for reuse of the washed beads 22 in the conduit 26. The direction of flow may be as shown for the solution 30 or it may be reversed (such as in a reverse-flush cleaning operation). Drying of the repeatedly washed beads 22 in the conduit 26 may again be preferred, but is not deemed to be necessary. After a predetermined period of time of exposure to a new quantity of contaminated solution (not shown) they will again became saturated with the MTBE molecules 12 and will again require cleaning (washing). This process is repeated for the life of the conduit 26, which may be substantial.

To improve efficacy, it is of course possible to provide a plurality of parallel conduits (not shown) utilizing some of all of them at the same time. Additional clean conduits (not shown) may be substituted for saturated ones that are being cleaned to maintain nearly constant remediation.

Alternatively, a cleaning solution (not shown) that contains any of the cleaning substances mentioned hereinabove (or other types of cleaning substances) may be marketed specifically for the purpose of cleaning the interior of the conduit 25 that contains the washed beads 22 after they have become saturated with the MTBE molecules 12.

The cleaning solution may include any desired cleaning agent or agents but it is preferred that those agents be as non-toxic as possible. If desired, the acidic alcoholic mixture, mentioned hereinabove, can be used to clean the washed beads 22 after they have become saturated with the MTBE molecules 12 from the aqueous solution 30.

The number of wash cycles that the conduit 26 and the washed beads 22 may be subjected to is a function of the type of material used to form the conduit 26 as well as the durability of the washed beads 22.

Figure 8:
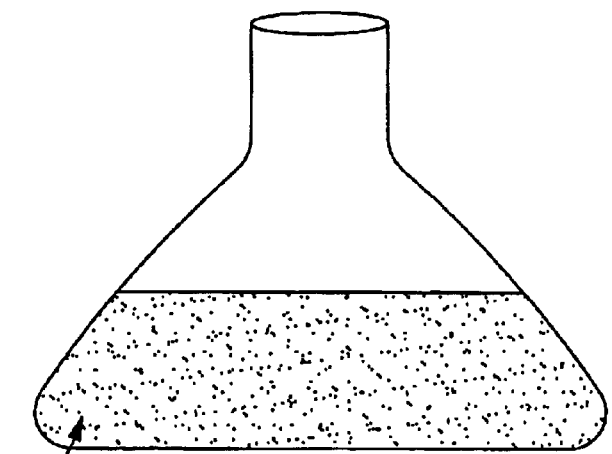
FIG. 8 is a diagram of a test setup used to determine the efficacy of the process.
Figure 9:
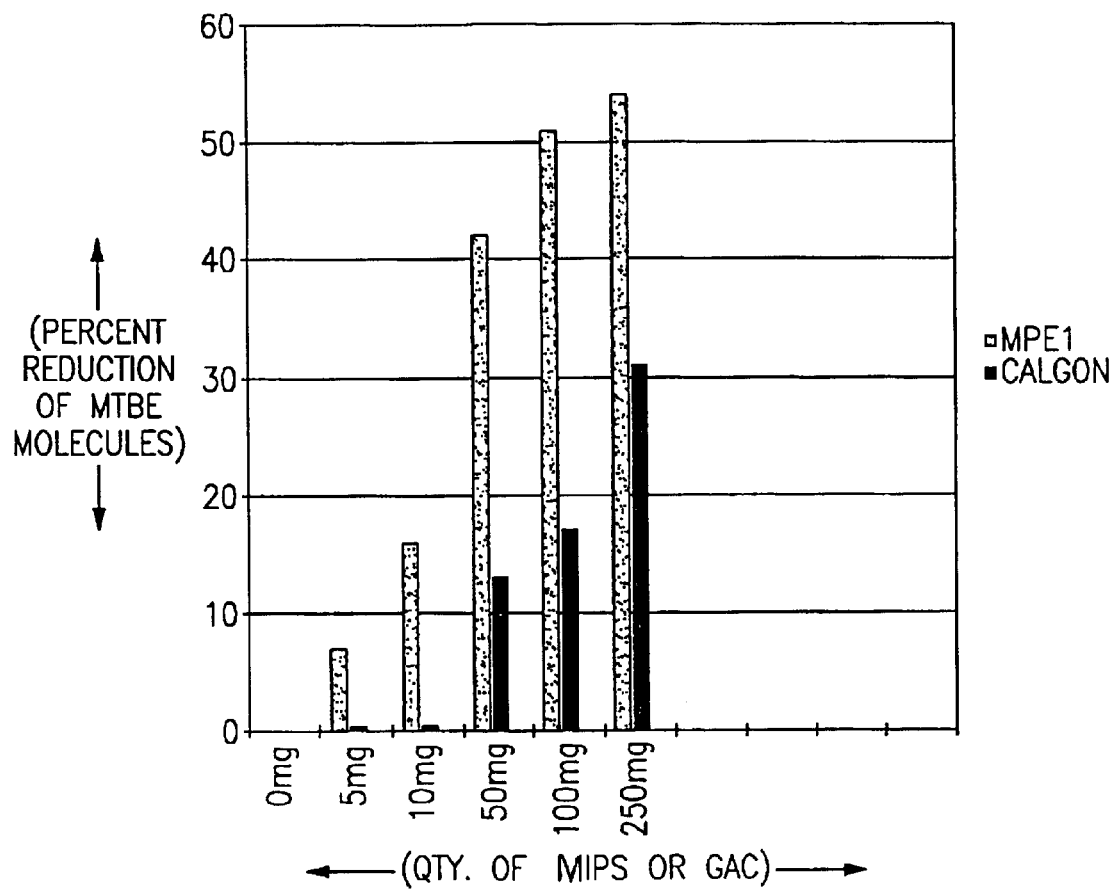
FIG. 9 is a bar graph comparison between the efficacy of using a GAC compared with that of the MIPs of the instant invention in accordance with the test setup of FIG. 8.

Referring now to FIG. 8 is shown a diagram of a test setup used to determine the efficacy of the process. Either a quantity of MIPs or a GAC (available from the Calgon Corporation) is mixed into a contaminated quantity of water containing 500 parts per billion of MTBE, the mixture is stirred for one hour, and then the water is analyzed to determine the percentage reduction of MTBE. A comparison between the use of the GAC and the MIPs of the instant invention is shown in a bar graph of FIG. 9. The instant invention is substantially more effective at removing MTBE from the water.

Figure 10:
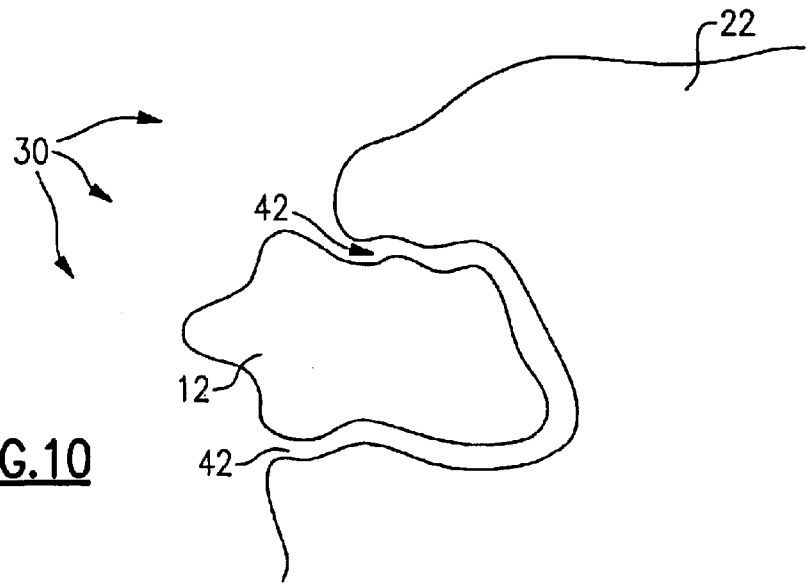
FIG. 10 is a pictorial view of a receptor site cooperating with a portion of an MTBE molecule sufficient to remove it from solution.

FIG. 10 shows pictorially, one of many of the MTBE molecules 12 in the solution 30 that is flowing through the conduit 26. The MTBE molecule 12 shown in FIG. 10 has been captured by a first receptor site 42 (one of many) that is disposed on the surface of one of the washed beads 22 (only a partial view of the washed bead 22 is shown). There are many such receptor sites 42 on each of the washed beads 22 that line the inside surface of the conduit 26. The MTBE molecule 12 as shown, therefore, has been removed from the solution 30, thereby helping to change the solution 30 into the remediated solution 34.

The receptor site 42 corresponds with but a portion of the shape of the MTBE molecule 12, yet that is sufficient to retain it in place and remove it from the solution 30.

Continuing the rock and ice analogy from before, the shape of the MTBE molecule 12 is unique as is the shape of the identically shaped rock (or identically shaped rocks) that were used in the analogy.

The process can also be compared to an attempt to open a lock with a key. The match between lock and key is highly specific and only the assigned key will open the door. With molecular imprinting only the correctly shaped molecule fits into the physical "key holes" (receptor sites) that are provided in the washed beads 22.

Certain of these forces that retain the MTBE molecules 12 in a position of cooperation proximate the receptor sites of the washed bead 40 include hydrogen bonding, electrostatic bonding, and non-specific non-covalent bonding. As is well known in the chemical arts, various means may be employed to vary the influence of these forces, as desired.

When the grinding operation occurs so as to produce the unwashed beads 18, they may produce various matching profiles. Therefore, the actual physical and chemical profile of the sites will vary from site to site, but in general the shape of all of those sites that are targeted for the MTBE molecule 12 will correspond with at least some portion of the shape of the MTBE molecule 12.

Of course, due to imperfections in the process and impurities other trace molecular sites will also occur in the unwashed beads 18, however their frequency will be low and insignificant. These imperfections are responsible for removal of other substances in trace amounts from the solution 30.

It is also possible that some of the receptor sites that do contain an imprint of the MTBE molecule 12 will, on occasion, inadvertently remove a molecule (not shown) other than the MTBE molecule 12 that is targeted, however, this again is of such a low probability of occurrence so as to be statistically insignificant.

When this process of contact by the solution 30 with the sites in the conduit 26 is repeated countless millions of times, a substantial amount of the MTBE molecules 12 that were part of the solution 30 will have been extracted from the solution 30 thereby creating the remediated solution 34. As a result of mere contact by the solution 30 with the washed beads 22, the solution 30 loses some of the MTBE molecules 12 it contains and, as such, is transformed into the remediated solution 34.

Accordingly, the disclosed process for remediating the solution 30 is inert in that no active chemicals or ingredients are needed to remove the MTBE molecules 12 from the solution 30.

The remediated aqueous solution 34 is ready for testing and if it passes for consumption or if it fails for additional processing (i.e., flowing through the conduit 26), as desired.

It is also noted that the washed beads 22, once exposed to a sufficient quantity of the aqueous solution 30, eventually become, as mentioned hereinabove, saturated with the MTBE molecules 12. As also mentioned hereinabove, they may then be washed to remove a portion of the MTBE molecules 12 and, possibly, reused.

It is also important to note that when the saturated washed beads 12 are being washed, the MTBE molecules 12 may be collected and used for other purposes.

It is also noted that the surface of the washed beads 22 may contain a relatively small amount of the MTBE molecules 12 (from the concentrated extract) that were not removed when the unwashed beads 18 were first washed with the cleaning solution 20 (See FIG. 4). This is not of concern for two reasons. First, the MTBE molecules 12 that remain on the surface of the washed beads 22, having already resisted their removal from the surface by the cleaning solution 20, are not likely to become dislodged when the solution 30 is exposed thereto. Secondly, even if some of them were, in fact, to dislodge, the effect is negligible because for every one such possible addition to the solution 30, it would be offset by hundreds or thousands, if not millions of removals of the MTBE molecules 12 from the solution 30, thereby ensuring that the final product produced is, when compared to the solution 30, the remediated solution 34.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

For example, if the conduit 26 were not used, then the washed beads 22 (a large quantity) would be placed into a container that included openings that were smaller than the washed beads 22 (so they wouldn't fall out) yet large enough to let the contaminated solution 30 flow past the washed beads 22 and become the remediated solution 34 when it exited therefrom.

What is claimed is:

1. A process for removing at least one MTBE molecule from a solution, which comprises the steps of:

exposing said solution to an inert material adapted to remove a portion of the MTBE therefrom wherein said inert material includes a molecularly imprinted polymer, said molecularly imprinted polymer having at least one site imprinted thereon;

wherein the step of exposing includes the step of contacting said solution with said inert material, said at least one site imprinted on the surface thereof of said inert material being adapted to cooperate with said MTBE by extracting said at least one MTBE molecule from said solution.

2. A process for removing at least some MTBE molecules from a solution, which comprises the steps of:

extracting at least one MTBE molecule from said solution with at least one molecularly imprinted polymer, said molecularly imprinted polymer having at least one site imprinted on the surface thereof that is adapted to cooperate with said MTBE molecule by contacting said molecularly imprinted polymer with said solution.

3. A process for removing at least one MTBE molecule from a solution, which comprises the steps of:

contacting said solution with at least one molecularly imprinted polymer, said molecularly imprinted polymer having at least one site imprinted on the surface thereof that is adapted to cooperate with at least a portion of a MTBE molecule.

4. The process of claim 3 wherein the step of contacting said solution includes extracting said MTBE molecule by contacting said solution with at least one molecularly imprinted polymer, said molecularly imprinted polymer having at least one site imprinted on the surface thereof that is adapted to cooperate with at least a portion of said MTBE molecule.

5. A process for removing at least one MTBE molecule from a solution, which comprises the steps of:

exposing said solution to at least one molecularly imprinted polymer, said molecularly imprinted polymer having at least one site on the surface thereof that is adapted to receive at least a portion of an MTBE molecule.

6. The process of claim 5 wherein the step of exposing includes exposing said solution to said molecularly imprinted polymer wherein said molecularly imprinted polymer includes means for retaining said MTBE molecule in proximity to said at least one site.

7. The process of claim 6 wherein said means for retaining includes non-covalent bonds.

8. The process of claim 6 wherein said means for retaining includes hydrogen bonds.

9. The process of claim 5 including the step of forming a plurality of molecularly imprinted polymer beads from said at least one molecularly imprinted polymer prior to the step of exposing said solution thereto.

10. The process of claim 9 wherein the step of forming includes grinding said at least one molecularly imprinted polymer.

11. The process of claim 9 wherein the step of forming includes pulverizing said at least one molecularly imprinted polymer.

12. The process of claim 9 wherein the step of forming includes fracturing said at least one molecularly imprinted polymer.

13. The process of claim 9 including the step of washing said plurality of molecularly imprinted polymer beads after the step of forming said plurality of molecularly imprinted polymer beads and prior to the step of exposing said solution thereto.

14. The process of claim 13 wherein the step of washing includes exposing said plurality of molecularly imprinted polymer beads to a cleaning solution.

15. The process of claim 14 wherein the step of washing includes exposing said plurality of molecularly imprinted polymer beads to a cleaning solution that contains a solvent.

16. The process of claim 14 wherein the step of washing includes exposing said plurality of molecularly imprinted polymer beads to a cleaning solution that contains an organic solvent.

17. The process of claim 9 including the step of removing at least a portion of MTBE molecules that were used to imprint said at least one molecularly imprinted polymer from the surface of said plurality of molecularly imprinted polymer beads after the step of forming said plurality of molecularly imprinted polymer beads and prior to the step of exposing said solution thereto.

18. The process of claim 13 including the step of drying said plurality of molecularly imprinted polymer beads after the step of washing said molecularly imprinted polymer beads and prior to the step of exposing said solution thereto.

19. The process of claim 13 including the step of reusing said plurality of molecularly imprinted polymer beads after the step of exposing said solution thereto.

20. The process of claim 19 wherein the step of reusing includes exposing a second solution to said molecularly imprinted polymer beads.

21. The process of claim 19 including the step of washing said molecularly imprinted beads after the step of exposing said solution thereto and before the step of exposing said second solution thereto.

22. The process of claim 9 including the step of exposing said plurality of molecularly imprinted beads to said solution.

23. The process of claim 5 including the step of imprinting said at least one site to correspond with at least a portion of the molecular shape of a MTBE molecule.

24. The process of claim 9 including the step of coating an inside surface of a conduit with said plurality of molecularly imprinted polymer beads prior to the step of exposing said solution thereto.

25. The process of claim 24 wherein the step of exposing said solution thereto includes the step of pumping said solution into said conduit.

26. A process for making a molecularly imprinted polymer adapted to receive a MTBE molecule, which comprises:

imprinting a molecular polymer to correspond with the molecular shape of an MTBE molecule.

27. A product adapted for removing at least one MTBE molecule from a solution, comprising:

(a) a plurality of molecularly imprinted polymer beads; and (b) a plurality of imprints disposed on a surface of at least some of said molecularly imprinted polymer beads that correspond with the molecular shape of a MTBE molecule.

28. The product of claim 27 including a conduit and wherein said plurality of molecularly imprinted polymer beads are disposed on a surface of said conduit.

* * * * *